United States Patent [19]

Ota et al.

[11] 3,914,986

[45] Oct. 28, 1975

[54] ULTRASONIC DEFECT DETECTING APPARATUS WITH MOVABLE DETECTIVE ELEMENT

[75] Inventors: Koji Ota, Yokohama; Eiji Yamamoto, Tokyo; Koji Sekiguchi, Komae, all of Japan

[73] Assignee: Tokyo Keiki Company Limited, Tokyo, Japan

[22] Filed: Oct. 11, 1973

[21] Appl. No.: 405,568

[30] Foreign Application Priority Data

Oct. 24, 1972  Japan.............................. 47-106476

[52] U.S. Cl................................ 73/67.8 S; 73/67.9
[51] Int. Cl.²......................................... G01N 29/04
[58] Field of Search............ 73/67.7, 67.8 R, 67.8 S, 73/67.9, 71.5; 235/151.13, 151.32

[56] References Cited
UNITED STATES PATENTS

| | | |
|---|---|---|
| 3,349,609 | 10/1967 | Ryzhov-Nikonov et al. ......... 73/67.9 |
| 3,575,042 | 4/1971 | Lovelace et al. ................. 73/67.8 S |
| 3,585,851 | 6/1971 | Walther................................ 73/67.9 |
| 3,673,860 | 7/1971 | Flaherty............................... 73/67.9 |
| 3,712,119 | 1/1973 | Cross et al. ........................... 73/67.7 |
| 3,805,597 | 4/1974 | Ohta et al. ........................... 73/67.9 |

*Primary Examiner*—Richard C. Queisser
*Assistant Examiner*—Stephen A. Kreitman
*Attorney, Agent, or Firm*—Toren, McGeady and Stanger

[57] ABSTRACT

Ultrasonic defect detecting apparatus with movable detective element wherein the starting position of the gate is set by the pulse generated at each instance the detective element is a certain distance from a point on the test piece, the location of which is calculated out from the factors of the detective element and the test piece. Automatic setting of the position of the said gate is achieved by providing a gate width determining circuit which is enabled by a certain output of a pre-set counter wherein the pre-set number of the pre-set counter can be shifted whenever the detective element attains a certain extent of travel.

5 Claims, 11 Drawing Figures

ULTRASONIC DEFECT DETECTING APPARATUS WITH MOVABLE DETECTIVE ELEMENT

The present invention relates to an ultrasonic defect detector for detecting defects in the weld, and more particularly to an ultrasonic defect detector having a movable detecting element in which the detecting element scans the welded seam to determine the position of the gate corresponding to the distance between the detective element and the welded seam, there-by automatic detecting of the welded seam of the surface is achieved.

Known apparatus for detecting defects in the welded seam is to scan the weld only in directions parallel with the welding line. However this type of defect detector will necessarily have dead angle so that some part of the weld cannot be scanned by the detector. In order to eliminate this disadvantage, manually-operated zigzag scanning or other types of scanning may be used for detecting defects of any portion of the weld, which is practically extremely inefficient and time-consuming.

An automatically operated defect detector has not been devised principally because of the following reasons. Most of the known types of ultrasonic defect detector employ the A-scope for the Brown tube, so that defect echoes are automatically detected through the gate supplied to the position they appear, and then the marking or recording of the defect echoes is carried out at this position. When an angular detective element (in which ultrasonic wave is transmitted at some angle with the surface of the test piece, in contrast with a vertical detective element) is employed for detecting defects in the weld, a defect F, in the weld 3 appears on a Brown tube which receives the defect signal from the detective element when the distance between the centre line 1 of the welded seam 3 and detective element 1 is $Y_1$ (the distance between the centre linen 1 and the detector 1 will hereinafter be called detector distance). As shown in FIG. 1 the detector 1 travels on the layer of some liquid such as oil or water, which is provided on the surface of the test piece 1. In this detecting operation as ultrasonic wave also reflects on the beat $B_1$ of the weld, it is also detected by the detector 1 and consequently the corresponding echo is produced on the Brown tube a certain time after echo $f_1$ is produced on the tube. Now referring to FIG. 2, T indicates a transmission pulse, $f_1$ is an echo of defect $F_1$ and $b_1$ is an echo of beat $B_1$, $f_1$ and $b_1$ being produced time $\omega_1$ and time $\omega_2$ respectively after the pulse T is produced. An automatic defect detecting element will pick up only an echo $f_1$ by providing a gate with the echo $f_1$, and record or mark the position of the defect $F_1$. G in FIG. 2 indicates a gate which starts at time $t_1$ after the transmission pulse T is produced and lasts for the time $\tau_2$. The width of the gate is so determined that the gate G may not contain the echo $b_1$ of the beat $B_1$. In other words the following two inequalities must be satisfied to detect the echo $f_1$ of the defect $F_1$.

$$\tau_1 [\lessgtr] \omega_1$$
$$\text{and } \omega_1 \lesseqgtr \tau_1 + \tau_2$$

FIG. 4 shows a block diagram of the conventional gate circuit, where 4 is a synchronising signal generator, 5 is a pulse generator, 6 is a receiver, 7 is a circuit for determining $\tau_1$ for starting position of the gate, 8 is a circuit for determining the width of the gate, and 9 is a gate mixing circuit. FIG. 5 shows a time chart for illustrating the timing of the various signals. The above described system for extracting defect echoes is now widely practiced and well known; therefore further explanation about that is avoided here.

Now referring back to FIG. 1, it is possible to detect defect $F_1$ when the detector distance is $y_1$, but not defect $F_2$ in the welded portion 3. In order to detect defect $F_2$ the detector distance must be increased to $y_2$. FIG. 3 shows a pattern on the Brown tube when the detector is adjusted for detecting defect $F_2$. Echo $f_2$ of defect $F_2$ will be extracted if starting point of the gate is shifted from $\tau_1$ to $\tau_2$.

Accordingly zigzag-scanning of every part of the welded seam will be possible if the starting point $\tau_1$ for the gate is automatically determined by the detector distance $y$. However according to the prior art the detector 1 scanned the weld only in a parallel direction with the welded seam. As a result the prior art had a disadvantage that the welded seam 3 cannot be scanned throughout since detector distance $y_1$ and factors $\tau_1$ and $\tau_2$ of the gate are fixed.

To explain the numbers of FIG. 5, 10 is a wave form of synchronising signal generator 4, 11 is a wave form for determining the starting point $\tau_1$ of the gate, 12 is a wave form for determining the width of the gate, 13 is an output wave form of the receiver 13, and 14 is an output wave form of the gate mixing circuit 9.

An object of the present invention is to eliminate the above stated drawbacks of the conventional ultrasonic defect detecting apparatuses.

Another object of the present invention is to provide an ultrasonic defect detector apparatus with a movable detecting element wherein a detecting element zigzag-scans every part of the weld.

A further object of the present invention is to provide an ultrasonic defect detector apparatus with a movable detecting element wherein the of the gate is shifted automatically in response to a pulse generated every time the detective element travels for a certain distance from the welded seam.

A still further object of the present invention is to provide an ultrasonic defect detector apparatus with a movable detecting element whereby detecting every part of the weld is achieved and therefore an efficient defect detecting operation of the type is attained.

The above described objects and features of the present invention will be explained in detail with reference to a favourable embodiment of the present invention.

Figure 1:
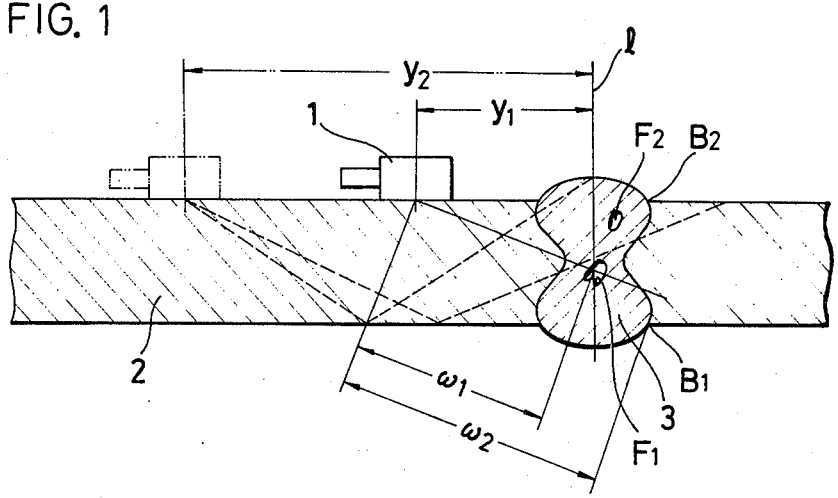
FIG. 1 shows a principle of detecting defects of the welded seam.
Figure 2:
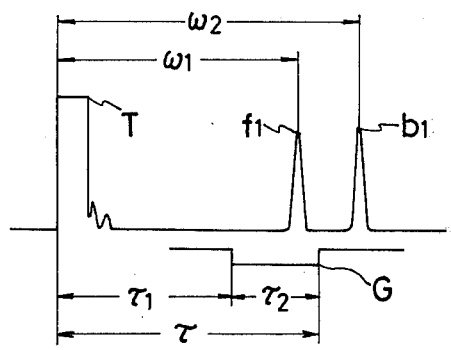
FIG. 2 shows a wave form on the Brown tube when known apparatus of FIG. 1 is used.
Figure 3:
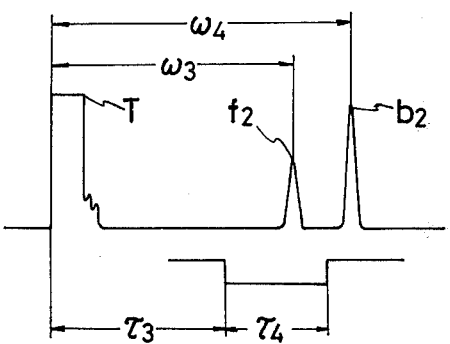
FIG. 3 shows a wave form similar to FIG. 2, but when the detector is shifted from the position of FIG. 2.
Figure 4:
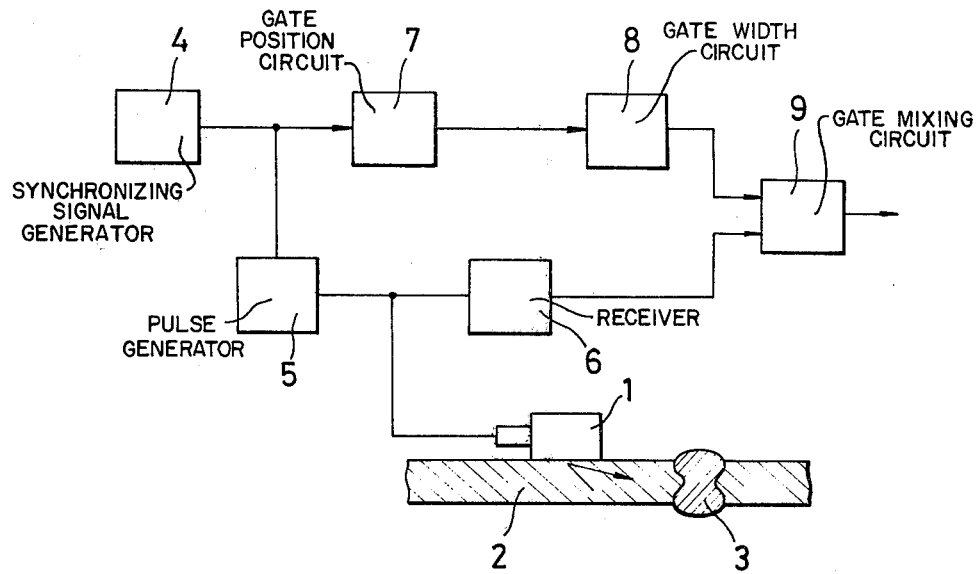
FIG. 4 is a block diagram of a known gate circuit.
Figure 5:
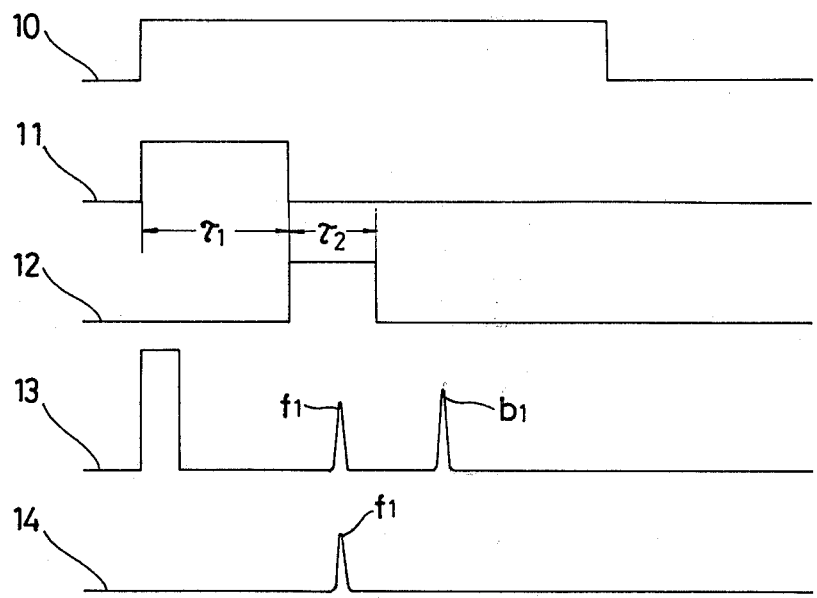
FIG. 5 is a time chart showing timing of each wave form produced in FIG. 4.
Figure 6:
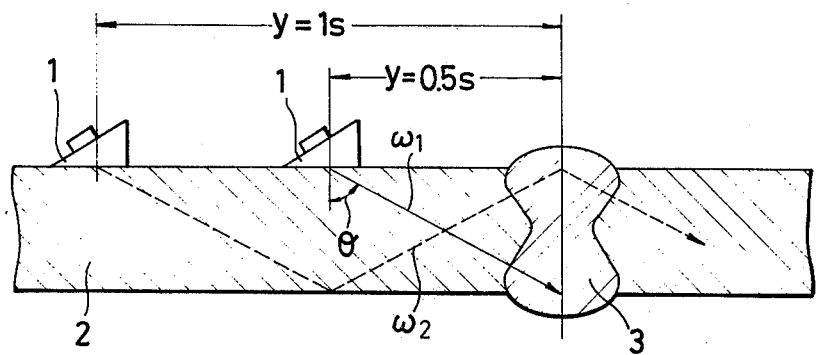
FIG. 6 shows an operation of the detector for detecting defects in the welded seam.
Figure 7:
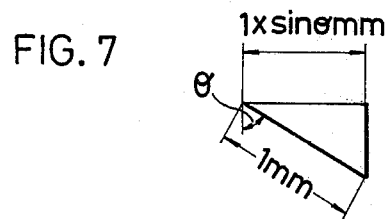
FIG. 7 shows the dimension of the detector 1.

Operation of detecting defects in the welded seam 3 fall in two stages. As the first stage the detecting element 1 is moved back and forth between the point of which detector distance $y = 1s$ and the point $y = 0.5s$, thereby detecting the left half of the welded seam 3 is completed, as shown in FIG. 6. Similar operation is, in turn, carried out from the right-hand side, and then the other half of the welded seam 3 is detected. Thus every part of the weld 3 is detected. The letter $s$ in the above explanation is a unit often used in ultrasonic defect detecting, indicating the distance between the detector 1 and the point at which the second reflection of the transmitted ultrasonic wave is made on the surface of the test piece 2, as shown in FIG. 6.

If the distance ($\tau$) between the transmission pulse and the end point of the gate is $t/\cos\theta$ when detector distance is $0.5s$, and is $2t/\cos\theta$ when detector distance is $1s$, echo of the defect can be extracted by this gate, where $t$ is thickness of the test piece 2 and $\theta$ is transmitting angle of the ultrasonic wave. When detector distance is between $0.5s$ and $1s$, position of the end of the gate is varied linearly with the detector distance. Position of the starting point of the gate may be varied only with the detector distance $y$, since the width of the $\tau_2$ and $\tau_4$ are fixed irrespective of the detector distance $y$. Here $\tau_2$ is favourably fixed at $t/2\cos\theta$. Accordingly starting point of the gate may be varied from $t/2\cos\theta$ to $$\left(\frac{3}{2}t\right)/\cos\theta \ (2t/\cos\theta - t/2\cos\theta = \left(\frac{3}{2}t\right)/\cos\theta)$$

depending on the detector distance y.

Figure 9:
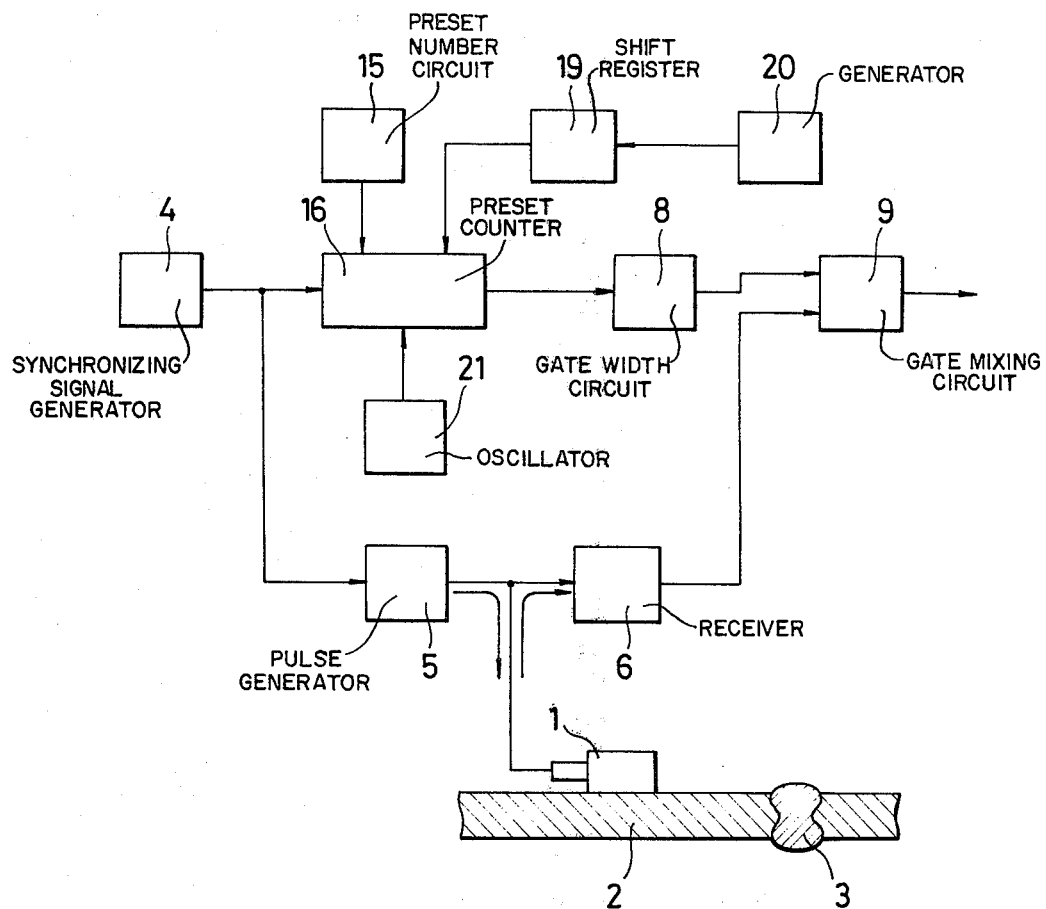
FIG. 9 is a block diagram of the ultrasonic defect detecting apparatus with a movable detector according to the present invention.
Figure 10:
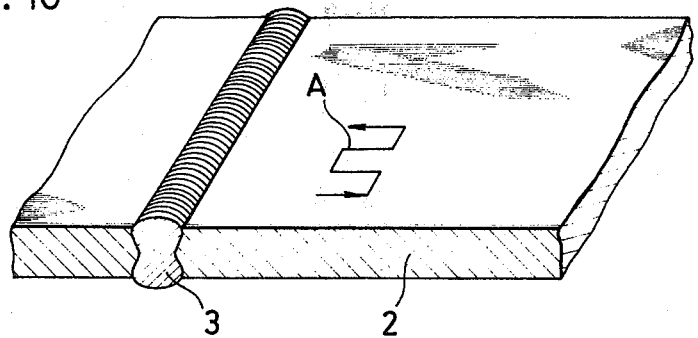
FIG. 10 shows the scanning route of the detector of the present invention.

FIG. 9 shows a block diagram of the present invention in which number 21 indicates an oscillator which generates a wave having frequency dependent on the speed of sound through the test piece 2. The time required for detecting over the distance of 1 mm of the steel material is $2/(3.2 \times 10^6)$ sec., for the speed of transversal wave of sound through the steel is generally $3.2 \times 10^6$ mm/sec. of an oscillator having oscillating frequency of 1.6 MHz which is the inverse number of the said time, one period of the wave corresponds to 1 mm. Number 16 is a pre-set counter which receives the synchronising signals from synchronising signal generator 4 and counts the signals from the above mentioned oscillator 21. Circuit 8 for determining the width of gate will be enabled when the counting number of the signals from the oscillator 21 reaches a certain number. If this certain number is pre-set to $t/2\cos\theta$, $\tau_1$ will be automatically determined. Number 15 is a circuit for setting manually the pre-set number of the pre-set counter 16. Pre-set number of the said pre-set counter 16 must be changed corresponding to the varied distance between the detecting element 1. and the weld 3. The ratio of this alteration of pre-set number is one to every $1 \times \sin\theta$ mm of the movement of the detecting element 1. Number 20 is a generator which produces one pulse every time the detecting element 1 withdraws for $1 \times \sin\theta$ mm from the position of $0.5s$. Number 19 shows a shift register which shifts the data one by one in response to the pulse signal from the said oscillator 20. Pre-set counter 16 is so arranged that its pre-set counting number will be increased by one if data of the said output wave form 4 is shifted by one. In practice, as shown in FIG. 10, the detective element travels along the arrow A, and the detective element 1 will turn to go forward when it has completed the travel of $t \sin\theta$; and the shift register 19 may subtract one from the pre-set number in response to every singled pulse from the oscillator 20.

Figure 8:
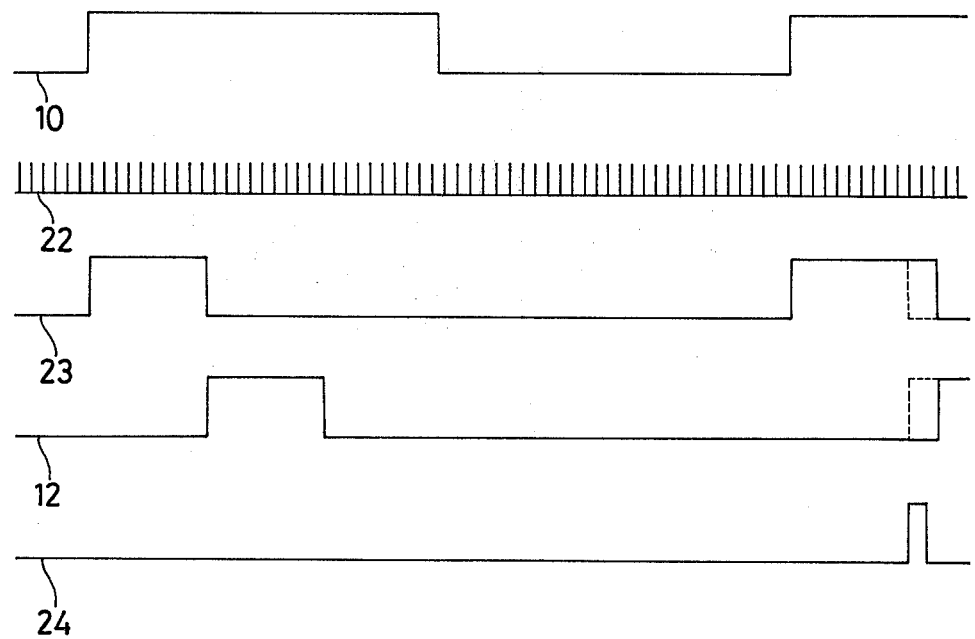
FIG. 8 is a time chart according to the present invention.

Thus automatic precise detecting of defects of the weld 3 may be achieved if the position of the gate is automatically determined by the detector distance. FIG. 8 shows a time chart of the present invention for showing the timing of various signals used in the present invention, where 10 is synchronising signal from the synchronising signal generator 4, 22 is signal having frequency depending on the wave of sound through the test piece, 23 is signal from the pre-set counter 16, wave form 12 is gate signal, and wave form 24 is signal from shift register 19.

Figure 11:
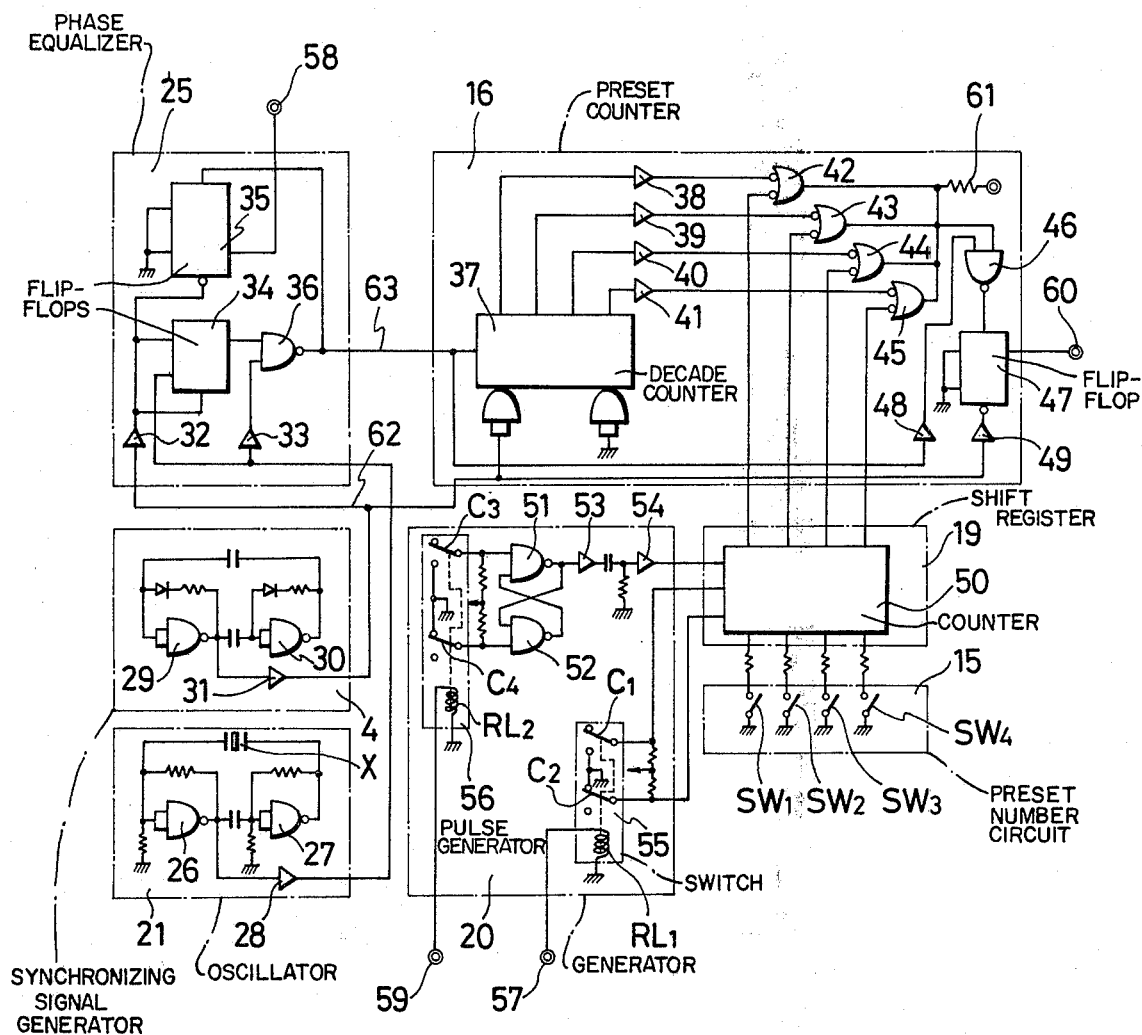
FIG. 11 illustrates more detailed construction of the major portion of FIG. 9.

FIG. 11 shows major parts of an embodied circuit of the ultrasonic defect detector apparatus of the present invention which has been described in connection with FIG. 9, where 15 is a manual determining circuit, 16 is a pre-set counter, 19 is a shift register, 20 is a generator which is enabled in response to a shift of the detective element, 21 is an oscillator oscillating waves having frequency depending on the wave of sound, and 4 is a synchronising generator.

In FIG. 11 synchronising signal generator 4 comprises an astable multivibrator in which integrated circuits 29 and 30 are incorporated, and, an integrated circuit 31 for forming the output of the astable multivibrator into wave form. An oscillator 21 oscillating at a frequency depending on the speed of sound comprises astable multvibrator including integrated circuits 26 and 27, quartz oscillator $x$ which determines oscillating frequency of the above mentioned astable multivibrator, and an integrated circuit 28 for forming the output of the said astable multivibrator into wave form. The output signals from the generator 4 and oscillator 21 are always out of phase, since oscillation of generator 4 and that of oscillator 21 are not synchronised. Hence a phase equalizer 25 is disposed at the output stage of the generator 4 and oscillator 21, to control each of the two phases. This phase equalizer 25 comprises integrated circuits 34 and 35 consisting of known D-type-edge-triggered flip-flop, respectively, integrated inverters 32 and 33, and NAND gate 36. This phase equalizer 25, controls the output wave founds 10 and 22 from the generator 4 and oscillator 21 so that the both wave forms comes into phase. The output terminal 58 of the circuit 25 is connected to the heretofore described pulse generator 5, and the output of this equalizing circuit 25 is applied through line 63 to the decade-counter 37 which is incorporated in the pre-set counter 16. This pre-set counter 16 comprises said decade-counter 37, inverters 38, 39, 40 and 41, four NOR gates 42, 43, 44 and 45 of which input terminals are connected to the output terminals of the said inverters, NAND gate 46 to which the common output terminal of the said four NOR gates 42, 43, 44 and 45 is connected at one of the input terminals thereof, resistor 61 connected to the said common output terminal, inverter 48 connected between the output 63 of the said phase equalizing circuit 25, and the other input terminal of the NAND gate 46, integrated circuit 47 consisting of D-type-edge-triggered flip-flop disposed at the output stage of the said NAND gate circuit 46, and inverter 49 connecting between the output line 62 of the said synchronising signal generator 4 and the reset terminal of the said integrated circuit 47. Output signal from the integrated circuit 47 consisting of D-type-edge-triggered flip-flop is applied to the circuit 8 in FIG. 9 for determining the width of the gate pulse, through the terminal 60.

Circuit 19 consists of synchronous up down counter 50 which corresponds to a shift register. Number 15 indicates four binary coded decimal switches $SW_1$, $SW_2$, $SW_3$ and $SW_4$ which are operated when manual setting of the starting point of the gate is required; these four switches are connected to the said synchronous up down counter 50. Four output terminals of the said synchronous up down counter 50 are connected to the other input terminals of the said NOR gates 42, 43, 44 and 45. Oscillator 20 for oscillating in response to a shift of the aforementioned detective element is connected to the input terminals of the said synchronous up down counter 50. The oscillator 20 is provided with pulse generator 56 and switch 55 which is enabled by back or forward movement of the detective element 1. The above mentioned switch 55 comprises relay $RL_1$ connected to the terminal 57 of a switch (not shown) which detects the back and forth movement of the detective element 1, and switches $C_1$ and $C_2$ which are operated by the relay $RL_1$. Switch $C_1$ closes when the forward movement of the detective element in detected, and switch $C_2$ closes with the backward movement of the detective element; these two switches $C_1$ and $C_2$ are connected to the input terminals of the above mentioned synchronous up down counter 50, respectively.

Pulse generator 56 comprises relay $RL_2$ connected to the output terminal 59 of a detector (not shown) for detecting the extent of travel of the detective element 1, and switches $C_3$ and $C_4$ which are operated by the above mentioned relay $RL_2$. These two switches $C_3$ and $C_4$ are connected to the integrated NAND circuits 51 and 52, respectively to generate pulse in a known manner. Output pulse thus obtained is stabilized by inverters 53 and 54 to be applied to one of the adders or subtractors of the said synchronous up down counter 50.

The starting point of the gate pulse can be set by closing any one of the switches $SW_1$, $SW_2$, $SW_3$, and $SW_4$ which are disposed in the manual setting circuit 15. Now if detective element 1 moves forward, relay $RL_1$ is enabled to close the switch $C_1$, and correspondingly the said synchronous up down counter 50 is set to adding state. Relay $RL_2$ is energized and de-energized by each pulse it receives at the terminal 59 which is generated every $1 \times \sin\theta$ mm the detective element 1 moves, and correspondingly switches $C_3$ and $C_4$ operate to cause NAND gates 51 and 52 to invert alternately and generate pulse. This pulse is applied to the said synchronous up down counter 50 through inverters 53 and 54. The synchronous up down counter 50 adds this pulse to the position set by any one of the said switches $SW_1$, $Sw_2$, $SW_3$ and $SW_4$, and outputs this pulse at any one of the NOR gates 42, 43, 44 and 45. If detective element 1 moves backward, relay $RL_1$ is de-energized to open switch $C_1$ and close Switch $C_2$. With this action of the switches $C_1$ and $C_2$, the said synchronous up down counter 50 is set to subtracting state. Therefore the synchronous up down counter 50 subtract pulses one by one from the count of the pulse at the end of the forward movement of the detective element.

In FIG. 11, decade-counter 37 can be reset to permit counting by the output of the synchronising signal generator 4 through the output line 62. Clock pulse generated by the oscillator 21 travels through the phase equalizing circuit 25 to the output line 63, and is counted by the decade-counter 37. Coincidence between the output of decade-counter 37 and that of shift register 19 is picked up by at least one of NOR gates 42, 43, 44 and 45, and D-type-edge flip-flop 47 is enabled through NAND gate 46. The output of this flip-flop 47 is applied to gate width determining circuit 8 through the terminal 60.

Heretofore described circuits are so constructed that they are controlled with one figure of decimal number. However they can also be controlled with two or more figures of decimal number is a plurality of pre-set counters 16 and shift registers 19 are disposed in series respectively.

For illustrative purposes the description if the present invention has been confined to the angular defect detecting system, but it does not limit the application of the present invention to other types of defect detecting system such as vertical defect detecting, within the scope and spirit of the present invention, none the less.

As has been described above, according to the present invention, it is possible to carry out automatic defect detecting of every portion of the weld, and also to raise the degree of precision of defect detecting. Therefore a disadvantage of having a dead angle inherent to the prior art has been completely eliminated, and thus most efficient defect detecting operation of the kind has now been achieved.

We claim:

1. In an ultrasonic defect detecting apparatus for detecting defects of a weld in a test piece of the type having a movable ultrasonic detecting element, means for gating defect signals received from said weld and means for determining the width of said gate of said gating means, the improvement comprising;
    a first oscillator means for oscillating at a frequency dependent on the speed of sound through said test piece;
    a pre-set counter, responsive to said oscillator means, for setting the starting point of said gate by counting pulses developed by said oscillator;
    a second oscillator means for generating one pulse when said detecting element moves a predetermined distance;
    and a shift register responsive to said pulses of said second oscillator for changing the number pre-set into said pre-set counter according to the number of pulses received from said second oscillator,
    whereby the timing of said gate is automatically set in accordance with distance between the detecting element and the weld.

2. An ultrasonic defect detecting apparatus with movable detecting element according to claim 1, wherein said pre-set counter can shift the starting position of the gate from $t/2 \cos\theta$ to $(3t/2) \cos\theta$, where $t$ is the thickness of the test piece and is the transmitting angle of the ultrasonic wave which amount corresponds to the distance between said defective element and the weld.

3. An ultrasonic defect detecting apparatus with a movable detective element according to claim 2, wherein said shift register shifts the pre-set counting number of said pre-set counter by one whenever said detective element moves a distance of $1 \times \sin\theta$.

4. An ultrasonic defect detecting apparatus with movable detective element according to claim 2, wherein said second oscillator means oscillates one pulse whenever said detective element moves a distance of $1 \times \sin\theta$ from a point which is $0.5s$ from the weld.

5. An ultrasonic defect detecting apparatus, with movable detective element according to claims 2, wherein said shift register subtracts one from said preset counting number whenever one pulse is generated from said second oscillator means when said detective element after scanning along the weld moves backward after the distance of $t \sin\theta$ is completed.

* * * * *